(No Model.)

E. & B. HOLMES.
SUGAR CANE PLANTER.

No. 335,129. Patented Feb. 2, 1886.

Witnesses.
Jennie H. Caldwell
Arthur Sangster

Inventors.
Edward Holmes
Britain Holmes.
By James Sangster
Atty.

UNITED STATES PATENT OFFICE.

EDWARD HOLMES AND BRITAIN HOLMES, OF BUFFALO, NEW YORK.

SUGAR-CANE PLANTER.

SPECIFICATION forming part of Letters Patent No. 335,129, dated February 2, 1886.

Application filed May 22, 1885. Serial No. 166,362. (No model.)

*To all whom it may concern:*

Be it known that we, EDWARD HOLMES and BRITAIN HOLMES, citizens of the United States, residing in Buffalo, in the county of Erie and State of New York, have invented certain new and useful Improvements in Sugar-Cane Planters, of which the following is a specification.

Sugar-cane is usually planted in long pieces, or in stalks of full length, and the plants start from the joints of the cane.

The object of our invention is to produce a cheap practical cane-planting machine that may be used not only as a cane-planter, but also as a useful farm cart or wagon; but its greatest value consists in its cane-planting mechanism, by which we produce a machine that will plant and cover up pieces of cane of any length with rapidity and ease, and with less expense than it can be done by hand, all of which will be fully and clearly hereinafter described, claimed, and shown by reference to the accompanying drawings, in which—

Figure 1:
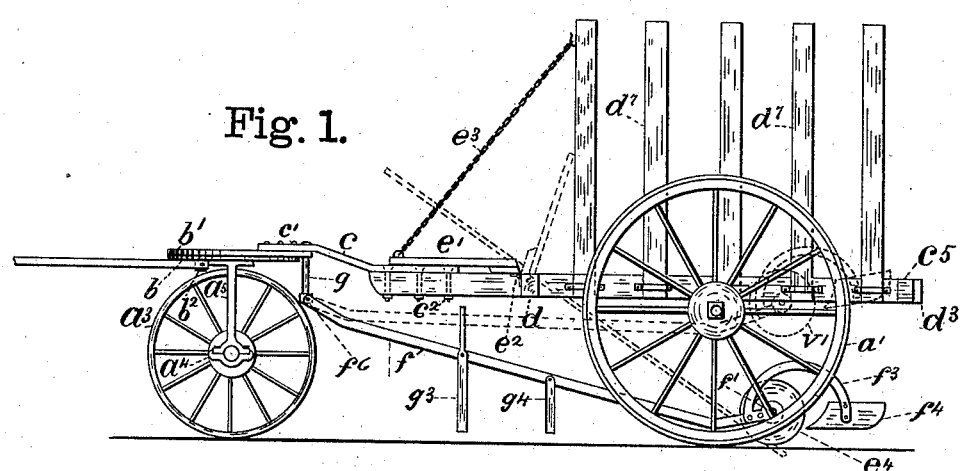
Figure 2:
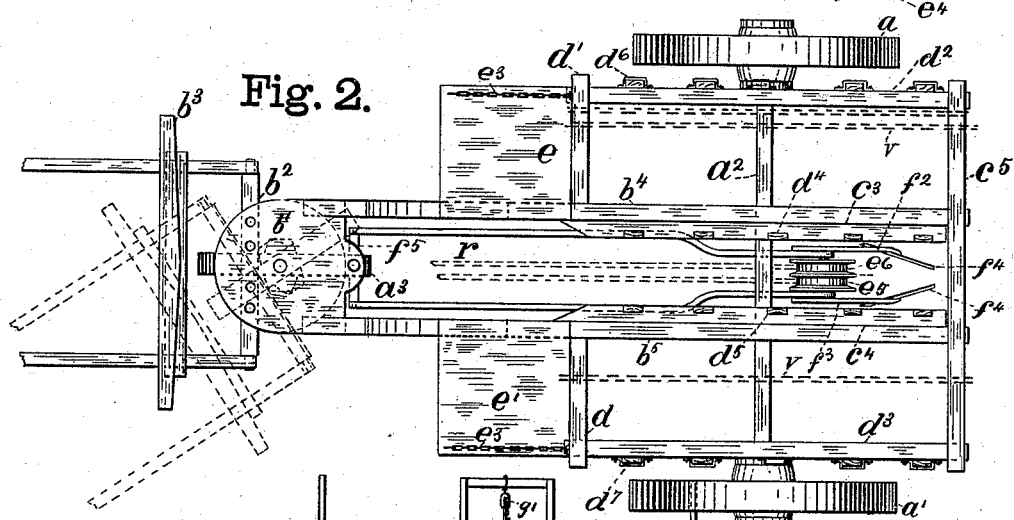
Figure 3:
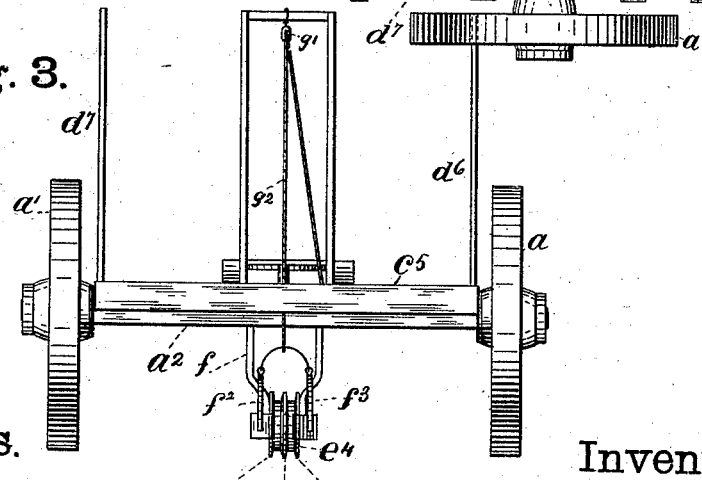

Figure 1 is a side elevation of the machine complete. Fig. 2 represents a plan or top view, and Fig. 3 is a back end view.

The machine is set upon wheels, $a$ $a'$ being the rear wheels. They are about four feet in diameter, and have a broad face of about five or six inches (or more) so that it can be drawn over the soft earth without sinking in too far. They are attached to the rear axle-tree, $a^2$, in the usual way. The front wheel, $a^3$, when one is used, is mounted in boxes $a^4$ on a forked vertical bar, $a^5$. It is also provided with a wide face to enable it to run on the soft earth. The forked bar $a^5$ is rigidly fastened to a circular plate, $b$, by bolts or rivets in any well-known way, and the plate $b$ is pivoted to the plate $b'$, which forms a portion of the platform and frame.

To the front part of the plate $b$ is rigidly fastened a cross-bar, $b^2$, to which the shafts, whiffletree $b^3$, and other parts for connecting the horse or horses are attached; but as this part is old and well known a further description is unnecessary. A single wheel is used in front, so as to adapt the vehicle or machine to turn short corners, and also to run in the furrow when the cane is planted, as it guides the machine, and it is easier to keep it in line with the furrow; but although we show and prefer to use but one wheel in front of the vehicle, as being best adapted for the purposes above mentioned, it can be made to operate with two wheels in front, but we believe not so well; or, if desired, the front wheel may be omitted entirely, in which case the weight of the front part of the vehicle would be on the necks of the horses or mules, and we do not think it would operate as well.

The frame consists of the longitudinal beams $b^4$ $b^5$, secured to the plate $b'$ by means of the bars $c$, rivets $c'$, and bolts $c^2$.

$c^3$ $c^4$ represent two beams firmly secured to the beams $b^4$ $b^5$. Their front ends are chamfered off, as shown, so as not to interfere with the feeding of the cane. This construction leaves an opening, $r$, through which the cane is dropped in the furrow.

If desired, a plow may be connected to the front part of the wagon, so as to open a furrow into which the cane can be dropped, although when a deep furrow is to be opened it is preferred to make it with an independent plow.

The letter $c^5$ represents a rear cross-beam, mortised or otherwise secured to the beams $b^4$ $b^5$.

Toward the front of the machine are two transverse beams, $d$ $d'$, which are firmly secured to the beams $b^4$ $b^5$. Their outer ends and the ends of the beams $c^5$ are rigidly secured to the longitudinal beams $d^2$ $d^3$, and to the beams $c^3$ $c^4$ are a series of vertical posts, $d^4$ $d^5$. A similar series of posts, $d^6$ $d^7$, are attached in any well-known way to the beams $d^2$ $d^3$. Their object is to provide the means for holding a large quantity of the cane to be planted, which is laid, as shown by the dotted lines $v$ in Fig. 2, between the posts.

The letters $e$ $e'$ represent two platforms, hinged by hinges $e^2$ to the beams $d$ $d'$, and securely held at their opposite ends by a chain, $e^3$. The object of these hinged platforms is to provide the means for turning them up out of the way of the horses or mules when turning the machine.

The planting-roller $e^4$ is provided with grooves $e^5$ $e^6$, which guide the cane as it is being pressed into the furrow. This planting-roller is mounted in a frame, $f$, in suitable bearings, $f'$. The projecting rims $h$ $h'$ $h^2$ on the planting-roller leave the grooves or openings between them, so that as it rolls over the cane it straightens it in the furrow, and at the same time spreads the rows of cane, as required. By this construction even the crooked canes can be straightened out and so held by the earth when covered, thereby saving the cutting of crooked canes.

To the frame $f$ are bolted two curved bars, $f^2$ $f^3$, having two covering-plates, $f^4$, firmly secured to them by rivets or bolts. The opposite ends of the frame $f$ are pivoted to a pivoted cross-bar, $f^5$, by pivots $f^6$, the cross-bar being pivoted to the vertical bar $g$, so that the frame can vibrate vertically and laterally.

When the planting-roller is not required for use, it can be drawn up out of the way by the rope and pulley $g'$ $g^2$, as shown by the dotted lines $v'$ in Fig. 1. It will be seen that when the roller and coverer are thus raised up, as above mentioned, the cart or wagon is fitted for carrying the cane from wherever it has been deposited to the field in which it is to be planted, and that at the beginning of a row or furrow the roller and coverer are easily lowered down. The frame $f$ is also provided on each side with the swinging bars $g^3$ $g^4$. Their object is to guide the cane into the furrow or prevent it from falling outside of it.

The operation of the machine is as follows: The front wheel is placed in a furrow, so that the rear wheels are in furrows on each side of the furrow to be planted. A man stands on each platform $e$ $e'$, and each takes a stick of cane from the pile between the vertical posts or bars, and places their ends in the furrow just under the planting-wheel, so that as the machine is drawn along the planting wheel or roller forces the cane down into the furrow, and the covering-plates draw the ground over it so as to cover it. Two rows of cane are planted a short distance apart, and it is laid so that the ends in each row lap by each other a little; but as this is well known a further description here is unnecessary.

The operator can plant the cane-stalks lengthwise in the furrow, or he can stand them up endwise, so that the roller as it advances will strike and force them down lengthwise into the furrow. In either case the canes can be planted end to end or be given as much lap as desired, at the discretion of the operator. Sugar-cane is usually planted in furrows or rows about six feet apart, consequently the wheels $a$ $a'$ are about that distance from each other, and between the furrows in which the cane is planted are furrows that these wheels run in, so that the cane is planted in every other furrow, and after one furrow has been planted and covered the machine is turned, one of the rear wheels on the turning side resting in the furrow while the vehicle is turning until the front wheel is brought into the next cane-planting furrow. The operation is then repeated until another row of cane is planted and covered.

We claim as as our invention—

1. A cane-carrying cart or wagon, substantially as described, provided with a pivoted wheel, $a^3$, in front of the vehicle, adapting it for turning short corners, a means for carrying the cane consisting of the platform or platforms upon which it is laid, and a series of vertical bars for keeping it in position, a platform for the operators, and a long narrow unobstructed longitudinal central opening through which long lengths of cane can be dropped into the furrow in continuous rows, substantially as specified.

2. A cane-carrying cart or wagon, substantially as above specified, provided with pivoted frame $f$, having a planting-roller provided with grooves on its periphery, so that as the cane is planted it is pressed into place and straightened by the roller in the position in the furrow in which it can be covered with the earth by the covering device.

3. A three-wheeled carrying cart or wagon having a central longitudinal opening through the floor, through which the cane may be passed and laid into the furrow, the front wheel being adapted to run in the furrow in which the cane is planted.

4. A cane-carrying cart or wagon having a longitudinal opening, in combination with a pivoted roller and covering device frame provided with loosely-hanging guide-arms, so that cane of various lengths dropped or falling lengthwise of the wagon will be guided in a line with it and form a continuous line or row of cane, as described.

5. A sugar-cane-planting machine consisting of a wagon or cart having a central longitudinal opening through the frame, a platform for the operators to stand on, and a double series of posts on each side of the longitudinal opening, in combination with a pivoted frame, $f$, having a planting-roller and a covering device, for the purposes described.

6. In a sugar-cane planter, the combination of a three-wheeled vehicle or wagon having a longitudinal opening through the center with a pivoted frame, $f$, having one or more pivoted guiding-bars, $g^3$ $g^4$, and a planting-roller and covering device, as and for the purposes described.

7. In a wagon or cart for planting sugar-cane, substantially as specified, the combination of the pivoted frame $f$, carrying the planting-roller and the covering device, with a rope and pulley, $g$ $g'$, secured to the upright posts, as described, for raising and lowering the planting wheel or roller and the covering device, substantially as specified.

EDWARD HOLMES.
BRITAIN HOLMES.

Witnesses:
JAMES SANGSTER,
JENNIE M. CALDWELL.